US012125317B2

United States Patent
Lee et al.

(10) Patent No.: US 12,125,317 B2
(45) Date of Patent: Oct. 22, 2024

(54) AUTOMATIC RECOGNITION OF VISUAL AND AUDIO-VISUAL CUES

(71) Applicant: ADOBE INC., San Jose, CA (US)

(72) Inventors: Jiyoung Lee, Seoul (KR); Justin Jonathan Salamon, San Francisco, CA (US); Dingzeyu Li, Seattle, WA (US)

(73) Assignee: ADOBE INC., San Jose, CA (US)

( * ) Notice: Subject to any disclaimer, the term of this patent is extended or adjusted under 35 U.S.C. 154(b) by 532 days.

(21) Appl. No.: 17/539,652

(22) Filed: Dec. 1, 2021

(65) Prior Publication Data

US 2023/0169795 A1    Jun. 1, 2023

(51) Int. Cl.
*G06V 40/20* (2022.01)
*G06N 3/045* (2023.01)
*G06N 3/08* (2023.01)
*G06V 10/82* (2022.01)
*G06V 20/40* (2022.01)

(52) U.S. Cl.
CPC ........... *G06V 40/20* (2022.01); *G06N 3/045* (2023.01); *G06N 3/08* (2013.01); *G06V 10/82* (2022.01); *G06V 20/41* (2022.01); *G06V 20/46* (2022.01); *G06V 20/49* (2022.01)

(58) Field of Classification Search
CPC ........ G06V 40/20; G06V 10/82; G06V 20/41; G06V 20/46; G06V 20/49; G06V 40/28; G06N 3/045; G06N 3/08; G06N 20/10; G06N 3/044; G06N 3/084
See application file for complete search history.

(56) References Cited

U.S. PATENT DOCUMENTS

| | | | |
|---|---|---|---|
| 2011/0293136 A1* | 12/2011 | Porikli | G06F 18/2178 382/103 |
| 2022/0051061 A1* | 2/2022 | Chi | G06V 10/764 |
| 2022/0139180 A1* | 5/2022 | Jahromi | G08B 13/19613 382/103 |
| 2022/0391758 A1* | 12/2022 | Huang | G06F 3/16 |

OTHER PUBLICATIONS

Zhang L, Chang X, Liu J, Luo M, Prakash M, Hauptmann AG. Few-shot activity recognition with cross-modal memory network. Pattern Recognition. Dec. 1, 2020;108:107348. (Year: 2020).*

(Continued)

*Primary Examiner* — Fayyaz Alam
(74) *Attorney, Agent, or Firm* — F. Chau & Associates, LLC

(57) ABSTRACT

A method for detecting a cue (e.g., a visual cue or a visual cue combined with an audible cue) occurring together in an input video includes: presenting a user interface to record an example video of a user performing an act including the cue; determining a part of the example video where the cue occurs; applying a feature of the part to a neural network to generate a positive embedding; dividing the input video into a plurality of chunks and applying a feature of each chunk to the neural network to generate a plurality of negative embeddings; applying a feature of a given one of the chunks to the neural network to output a query embedding; and determining whether the cue occurs in the input video from the query embedding, the positive embedding, and the negative embeddings.

20 Claims, 9 Drawing Sheets

(56) References Cited

OTHER PUBLICATIONS

Haddad M, Ghassab VK, Najar F, Bouguila N. A statistical framework for few-shot action recognition. Multimedia Tools and Applications. Jul. 2021;80:24303-18. (Year: 2021).*

Wang Y, Yao Q, Kwok JT, Ni LM. Generalizing from a few examples: A survey on few-shot learning. ACM computing surveys (csur). Jun. 12, 2020;53(3):1-34. (Year: 2020).*

Samuel Albanie, G"ul Varol, Liliane Momeni, Triantafyllos Afouras, Joon Son Chung, Neil Fox, and Andrew Zisserman. Bsl-1k: Scaling up co-articulated sign language recognition using mouthing cues. In European Conference on Computer Vision, pp. 35-53. Springer, 2020.

Yusuf Aytar, Carl Vondrick, and Antonio Torralba. Soundnet: Learning sound representations from unlabeled video. Advances in neural information processing systems, 29:892-900, 2016.

Joao Carreira and Andrew Zisserman. Quo vadis, action recognition? a new model and the kinetics dataset. In proceedings of the IEEE Conference on Computer Vision and Pattern Recognition, pp. 6299-6308, 2017.

Ryan Eloff, Herman A Engelbrecht, and Herman Kamper. Multimodal one-shot learning of speech and images. In ICASSP 2019-2019 IEEE International Conference on Acoustics, Speech and Signal Processing (ICASSP), pp. 8623-8627. IEEE, 2019.

Christoph Feichtenhofer, Haoqi Fan, Jitendra Malik, and Kaiming He. Slowfast networks for video recognition. In Proceedings of the IEEE/CVF international conference on computer vision, pp. 6202-6211, 2019.

Chuang Gan, Deng Huang, Hang Zhao, Joshua B Tenenbaum, and Antonio Torralba. Music gesture for visual sound separation. In Proceedings of the IEEE/CVF Conference on Computer Vision and Pattern Recognition, pp. 10478-10487, 2020.

Shiry Ginosar, Amir Bar, Gefen Kohavi, Caroline Chan, Andrew Owens, and Jitendra Malik. Learning individual styles of conversational gesture. In Proceedings of the IEEE/CVF Conference on Computer Vision and Pattern Recognition, pp. 3497-3506, 2019.

Yan Huang and Liang Wang. Acmm: Aligned cross-modal memory for few-shot image and sentence matching. In Proceedings of the IEEE/CVF International Conference on Computer Vision, pp. 5774-5783, 2019.

Will Kay, Joao Carreira, Karen Simonyan, Brian Zhang, Chloe Hillier, Sudheendra Vijayanarasimhan, Fabio Viola, Tim Green, Trevor Back, Paul Natsev, et al. The kinetics human action video dataset. arXiv preprint arXiv:1705.06950,2017.

Arne K"ohn, Florian Stegen, and Timo Baumann. Mining the spoken wikipedia for speech data and beyond. In Proceedings of the Tenth International Conference on Language Resources and Evaluation (LREC'16), pp. 4644-4647, 2016.

Taras Kucherenko, Patrik Jonell, Sanne van Waveren, Gustav Eje Henter, Simon Alexandersson, Iolanda Leite, and Hedvig Kjellstr"om. Gesticulator: A framework for semantically-aware speech-driven gesture generation. In Proceedings of the 2020 International Conference on Multimodal Interaction, pp. 242-250, 2020.

Zhi Lu, Shiyin Qin, Lianwei Li, Dinghao Zhang, Kuanhong Xu, and Zhongying Hu. One-shot learning hand gesture recognition based on lightweight 3d convolutional neural networks for portable applications on mobile systems. IEEE Access, 7:131732-131748, 2019.

Joanna Materzynska, Guillaume Berger, Ingo Bax, and Roland Memisevic. The jester dataset: A large-scale video dataset of human gestures. In Proceedings of the IEEE/CVF International Conference on Computer Vision Workshops, pp. 0-0, 2019.

Osama Mazhar, Sofiane Ramdani, and Andrea Cherubini. A deep learning framework for recognizing both static and dynamic gestures. Sensors, 21(6):2227, 2021.

Liliane Momeni, Gul Varol, Samuel Albanie, Triantafyllos Afouras, and Andrew Zisserman. Watch, read and lookup: learning to spot signs from multiple supervisors. In Proceedings of the Asian Conference on Computer Vision, 2020.

Omkar M. Parkhi, Andrea Vedaldi, and Andrew Zisserman. Deep face recognition. In Proceedings of the British Machine Vision Conference (BMVC), pp. 41.1-41.12, 2015.

Tomas Pfister, James Charles, and Andrew Zisserman. Domain-adaptive discriminative one-shot learning of gestures. In European Conference on Computer Vision, pp. 814-829. Springer, 2014.

Karol J Piczak. Environmental sound classification with convolutional neural networks. In 2015 IEEE 25th international workshop on machine learning for signal processing (MLSP), pp. 1-6. IEEE, 2015.

Zhaofan Qiu, Ting Yao, and Tao Mei. Learning spatiotemporal representation with pseudo-3d residual networks. In proceedings of the IEEE International Conference on Computer Vision, pp. 5533-5541, 2017.

Elahe Rahimian, Soheil Zabihi, Amir Asif, Dario Farina, Seyed Farokh Atashzar, and Arash Mohammadi. Fs-hgr: Few-shot learning for hand gesture recognition via electromyography. IEEE Transactions on Neural Systems and Rehabilitation Engineering, 2021.

Tara N Sainath and Carolina Parada. Convolutional neural networks for small-footprint keyword spotting. In Sixteenth Annual Conference of the International Speech Communication Association, 2015.

Bowen Shi, Ming Sun, Krishna C Puvvada, Chieh-Chi Kao, Spyros Matsoukas, and ChaoWang. Few-shot acoustic event detection via meta learning. In ICASSP 2020-2020 IEEE International Conference on Acoustics, Speech and Signal Processing (ICASSP), pp. 76-80. IEEE, 2020.

Karen Simonyan and Andrew Zisserman. Two-stream convolutional networks for action recognition in videos. In Advances in Neural Information Processing Systems, pp. 568-576, 2014.

Jake Snell, Kevin Swersky, and Richard Zemel. Prototypical networks for few-shot learning. In Proceedings of the 31st International Conference on Neural Information Processing Systems, pp. 4080-4090, 2017.

Jun Wan, Qiuqi Ruan, Wei Li, and Shuang Deng. Oneshot learning gesture recognition from rgb-d data using bag of features. The Journal of Machine Learning Research, 14(1):2549-2582, 2013.

Jun Wan, Yibing Zhao, Shuai Zhou, Isabelle Guyon, Sergio Escalera, and Stan Z Li. Chalearn looking at people rgbd isolated and continuous datasets for gesture recognition. In Proceedings of the IEEE Conference on Computer Vision and Pattern Recognition Workshops, pp. 56-64, 2016.

Pichao Wang, Wanqing Li, Song Liu, Yuyao Zhang, Zhimin Gao, and Philip Ogunbona. Large-scale continuous gesture recognition using convolutional neural networks. In 2016 23rd International Conference on Pattern Recognition (ICPR), pp. 13-18. IEEE, 2016.

Yu Wang, Justin Salamon, Nicholas J Bryan, and Juan Pablo Bello. Few-shot sound event detection. In ICASSP 2020-2020 IEEE International Conference on Acoustics, Speech and Signal Processing (ICASSP), pp. 81-85. IEEE, 2020.

Chen Xing, Negar Rostamzadeh, Boris Oreshkin, and Pedro O O Pinheiro. Adaptive cross-modal few-shot learning. Advances in Neural Information Processing Systems, 32:4847-4857, 2019.

Shilei Zhang, Yong Qin, Kewei Sun, and Yonghua Lin. Fewshot audio classification with attentional graph neural networks. In Interspeech, pp. 3649-3653, 2019.

* cited by examiner

AUTOMATIC RECOGNITION OF VISUAL AND AUDIO-VISUAL CUES

1. TECHNICAL FIELD

This disclosure relates generally to using Artificial Intelligence (AI) to recognize visual and audio-visuals cues, and more particularly to using few-shot learning to automatically recognize visual and audio-visuals cues.

2. BACKGROUND

Humans interact with computers in many ways, and an interface between the two is used for facilitating this interaction. The interface can be described as the point of communication between a human user and the computer. The flow of information between the human and the computer may be referred to as the loop of interaction. The loop of interaction may include acquiring audio information from audio signals output by a user and visual information of video signals output by the user. One or more words can be recognized from the audio information and one or more hand gestures can be recognized from the video information. Once a word or a hand gesture is recognized, it can be used to trigger execution of a function such as starting a certain program or sending a message.

The words and the hand gestures can be recognized automatically using artificial intelligence such as a machine learning model. Few-shot learning is a type of machine learning that can be used to classify data when a limited amount of training samples is available. One existing technique uses a few-shot sound event detection model to recognize a spoken word in the audio information. However, this technique has a difficult time distinguishing between similar sounding words, which can lead to execution of the wrong function or non-execution of the desired function. Another existing technique uses for detecting gestures from the visual information includes a one-shot learning framework that uses features obtained from a 3D network on a mobile system. However, when the visual signals include too much noise this technique could misinterpret the visual signals as including a gesture that is not actually present. Accordingly, a system that uses this technique is not robust to confounding factors and may produce an excessive number of false positive detections.

Thus, conventional tools are inefficient or unable to trigger execution of a function based on a recognized word or gesture.

SUMMARY

Systems, methods, and software are described herein for automatically recognizing a cue (e.g., a gesture or a spoken word/sound combined with the gesture) within an input video by determining a part of an example video where the cue occurs, applying a feature of the part to a neural network (e.g., a few-shot learning model) to generate a positive embedding, applying a feature of each chunk of the input video to the neural network to generate a plurality of negative embeddings, applying a given one of the chunks to the neural network to generate a query embedding, and using the generated embeddings to determine whether the cue occurs in the given chunk. If the cue does not occur in the given chunk, the process may be repeated again for another chunk of the video until a determination of the cue is made, or the entire video has been processed and no cue has been determined.

The cue may also be referred to as a trigger when recognition of the cue causes a certain function to be executed. Users are able to specify a custom cue or trigger. The user is not limited to a fixed set of cues, and can define their own, offering flexibility and customization. Once the model is trained, it can learn to recognize new classes (e.g., audio classes, visual classes, and audio-visual classes) on the fly given a small set of examples (e.g., 1-5).

In an exemplary application, the model is used to detect the cue in a live video stream to allow a user to trigger motion graphics and other video effects in real time using their hands and voice, without needing to use an input device such as a mouse or a keyboard. However, the inventive concept is not limited to this particular application. The model may be used to allow users to control various devices equipped with a camera and/or a microphone (e.g., a mobile phone, laptop, gaming console, etc.) using gestures, or a combination of gestures and voice. While gestures are described herein as being a hand gesture (e.g., a certain movement of a hand of a user), the inventive concept is not limited thereto. For example, a gesture can be a movement of any body part of the user including but not limited to movement of an arm, a leg, and a foot, and facial movements such as forming a smile, winking, blinking, eyebrow raising, etc.

According to an embodiment of the disclosure, a method for detecting a cue occurring in an input video includes: presenting a user interface to record an example video of a user performing an act including the cue; determining a part of the example video where the cue occurs; applying features of the part to the neural network to generate a positive embedding; dividing the input video into a plurality of chunks and applying features of each chunk to the neural network to output a plurality of negative embeddings; applying features of a given one of the chunks to the neural network to output a query embedding; and determining whether the cue occurs in the input video from the query embedding, the positive embedding, and the negative embeddings.

According to an embodiment of the disclosure, a system is configured to enable a user to create a custom cue that causes an action to be performed. The system includes a client device and server. The client device includes a user interface configured to enable a user to identify a function to be performed when the cue is recognized and record an example video of the user performing an act including the cue, and a computer program configured to record an input video of the user, wherein the client device outputs the example and input videos across a computer network. The server is configured to receive the example and input videos from the computer network, apply features of the example video to a few-shot learning model to output a positive vector, apply features of the entire input video to the few-shot learning model to output a negative vector, apply visual features of a part of the input video to the few-shot learning model to output a query vector, determine whether the cue has been detected in the input video based on the query vector, the positive vector, and the negative vector, and output information across the network to the client device when the cue has been detected. The computer program is configured to perform the function upon receiving the information.

According to an embodiment of the disclosure, a method for detecting a gesture and a sound occurring in an input video includes: presenting a user interface to record an example video of a user performing the gesture and making the sound; determining a first part of the example video where the sound occurs; determining a second part of the example video where the gesture occurs; applying an audio feature of the first part to a first neural network to generate a positive audio embedding; applying a video feature of the second part to a second neural network to generate a positive visual embedding; applying an audio feature of a part of a second video to the first neural network to output a query audio embedding; applying a visual feature of the part to the second neural network to output a query visual embedding; and determining whether the gesture and the sound occur in the second video from the query audio embedding, the query visual embedding, the positive audio embedding, the positive video embedding, and negative embeddings determined from the entire example video.

BRIEF DESCRIPTION OF THE DRAWINGS

The detailed description describes one or more embodiments with additionally specificity and detail through use of the accompanying drawings, briefly described below.

DETAILED DESCRIPTION OF EXEMPLARY EMBODIMENTS

An existing approach for detecting an occurrence of a cue within a video uses a few annotated examples of a spoken word to detect and a few-shot model trained on words to detect the cue. However, this approach may erroneously detect that the cue has occurred when the video includes a different word with a similar pronunciation. Another existing approach for detecting an occurrence of a cue within a video uses a one-shot learning model trained on visual features of a gesture to detect the cue. However, this approach may erroneously detect that the cue has occurred when the video includes too much noise. Further, these approaches are limited to a predefined set of gestures that would be difficult for users to remember, and it is time consuming for users to create negative examples of the desired gesture (e.g., videos that are not an example of the desired gesture).

At least one embodiment of the disclosure reduces or prevents the false detections that occur in the prior approaches by using an audio-visual cue rather than a visual cue and a few-shot model trained on a combination of sounds and gestures. Further, at least one method of the disclosure is not limited to difficult to remember predefined gestures since the method enables a user to create a custom cue in which the user specifies a desired gesture and word/sound combination or only the desired gesture, and the method learns the negative examples. This customization feature is useful when the user wants to use gesture controls in the context of a live video feed, where they may need to use a gesture that fits in naturally with actions the user is performing on screen. The customization ability is also useful for allowing users to customize gesture-based human computer interfaces for controlling mobile devices, home assistants, or gaming consoles. Further, since the audio-visual cue includes a combination of a visual cue (e.g., a gesture) and an audible cue (e.g., word/sound), the user can reuse the same visual cue with a different audible cue to define a different custom cue or trigger. Additionally, at least one embodiment of the disclosure does not require users to create negative examples of a desired cue since it automatically generates the negative examples from the input video itself.

Embodiments of the disclosure may also be used to add interactive motion graphics to environments such as live streaming, video conferencing meetings, augmented reality (AR), and virtual reality. At least one embodiment of the disclosure may be used to assist designers or video editors in identifying specific points within long recorded videos, thereby greatly reducing a user's data processing time. Furthermore, since embodiments of the invention are not limited to human gestures and speech, it can be directly applied to other domains such as character, generation action, music, or environmental sound.

Figure 1:
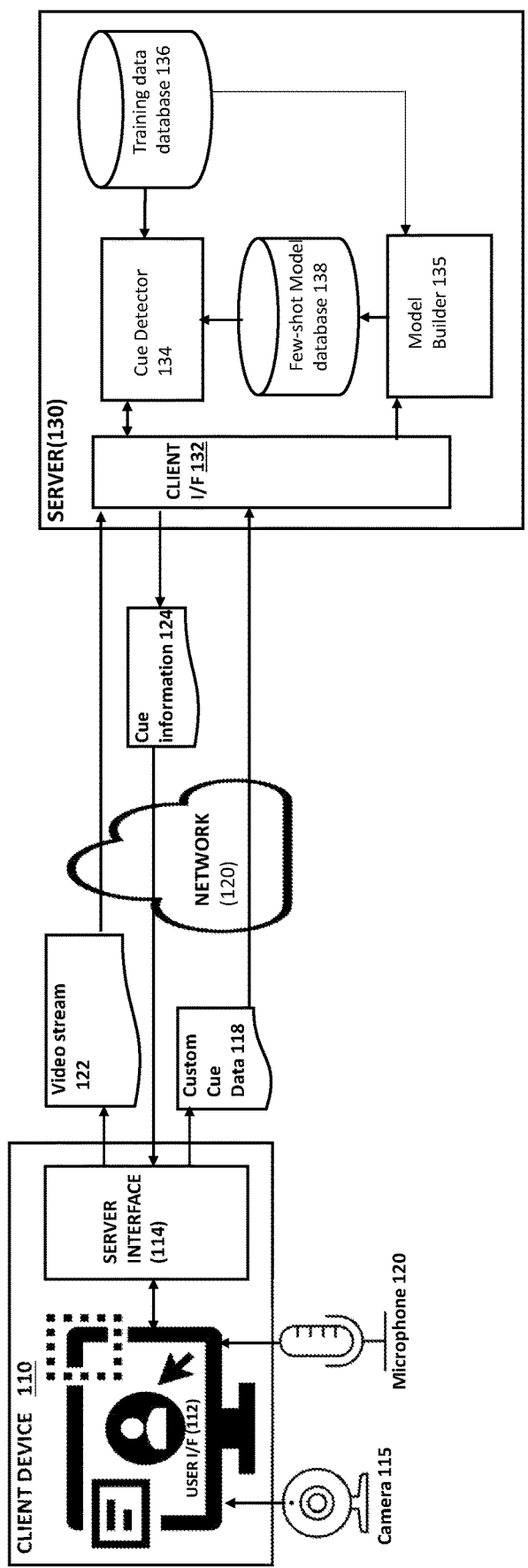
FIG. 1 illustrates a system for recognizing a visual or an audio-visual cue according to an embodiment of the disclosure.

Exemplary embodiments of the inventive concept are applicable to a client-server environment and a client-only environment. FIG. 1 shows an example of the client-server environment, where a user uses a graphical user interface 112 of a client device 110 to create a custom visual cue, create a custom audio-visual cue, or to perform an application configured to recognize a previously created custom cue and execute a function associated with the recognized cue.

In an embodiment, the user interface 112 is configured to enable a user to select a first graphic (e.g., 'create visual cue) for creating the custom visual cue, the user interface 112 asks the user to perform a visual cue (e.g., a gesture) in response to the user selecting the first graphic, and the user interface 112 uses the camera 115 to capture a video of the user performing making the visual cue. After the video has been captured, the user interface plays the video back to the user and asks the user to mark begin and end times where the visual cue occurs (i.e., a visual trigger) in the video. For example, the user may click a key on a keyboard or a button on a mouse as soon as they recognize the start of the visual cue to indicate to the user interface 112 the begin time. For example, the user may click a key on the keyboard or a button on the mouse as soon as they recognize the end of the visual cue to indicate to the user interface 112 the end time. The user interface 112 can then append metadata to the video indicating the start and end times of each instance of the visual cue in the video to create a labeled video. In an embodiment, the user interface 112 asks the user to input the same video cue several times so it can capture several such labeled videos (e.g., 1-5 videos).

In an embodiment, the user interface 112 is configured to enable a user to select a second graphic (e.g., 'create audio-visual cue') for creating the custom audio-visual cue, the user interface 112 asks the user to input a gesture together with a word/sound in response to the user selecting the second graphic, and the user interface 112 uses the camera 115 and the microphone 120 to capture a video of the user making the gesture and speaking the word/sound. After the video has been captured, the user interface 112 plays the video back to the user and asks the user to mark begin and end times where the gesture and word/sound occur together (i.e., the audio-visual trigger) in the video. For example, the user may click a key on a keyboard or a button on a mouse as soon as they recognize the start of the audio-visual cue to indicate to the user interface 112 the begin time. For example, the user may click a key on the keyboard or a button on the mouse as soon as they recognize the end of the audio-visual cue to indicate to the user interface 112 the end time. The user interface 112 can then append metadata to the video indicating the start and end times of each instance of the audio-visual cue. In an embodiment, the user interface 112 asks the user to input the same gesture and same word/sound several times so it can capture several such labeled videos (e.g., 1-5 videos) for the desired audio-visual cue.

In another embodiment, the user interface 112 asks the user to repeat the visual cue (e.g., a gesture) for the visual-only cue or repeat the visual cue and the audible cue for the audio-visual cue multiple times in the same video, and then select the start/end time of each repetition within the same video.

In yet another embodiment, a fixed time window (e.g., 2 seconds) is set, and the user interface 112 requires the user to record their cue within this window, thus removing the need to ask the user to mark the start/end times. In this embodiment, a short video is created and there is no need to append metadata to the video since the beginning of the video is the start of the cue and the end of the video is the end of the cue. For example, if the server 130 receives a stream of video the size of the fixed time window, the server 130 could assume that the video includes a single cue and does not include the metadata.

In an embodiment, the user interface 112 is configured to ask the user to identify a function to be performed when the custom cue is recognized. The user interface 112 may store a table on the client device 110 including an entry for each custom cue with a cue identifier uniquely identifying the custom cue and function identifier uniquely identifying the function to be performed when the custom cue is recognized.

In an embodiment, the server interface 114 outputs the labelled videos of the customer cue and its cue identifier as custom cue data 118 across the computer network 120. In an embodiment, the custom cue data 118 additionally includes a data field or bit indicating whether the custom cue is for only a gesture (e.g., a visual cue) or for a gesture combined with a word/sound (e.g., an audio-visual cue). For example, the bit could be a 1 to indicate a visual cue and a 0 to indicate an audio-visual cue.

A client interface 132 of the server 130 forwards the custom cue data 118 to the model builder 135. The model builder 135 has previously trained a few-shot model (e.g., a neural network) based on training data stored in the training database 136 to output an embedding (e.g., a numerical vector). The training of the few-shot model will be discussed in greater detail below. The model builder 135 generates positive prototype embeddings for the custom cue based on the labelled videos received in the custom cue data 118. The generation of the positive prototype embeddings for the custom cue will be discussed in more detail below.

When the user interface 112 is performing the application configured to recognize a previously created custom cue, the application controls the camera 115 and the microphone 120 to record a new video, and the server interface 114 outputs a video stream 122 including the new video across the computer network 120 to the server 130. The video stream 122 may include images of one or more gestures and audio of one or more words/sounds, where one of the gestures corresponds to the custom cue, or one of the gestures combined with one of the words/sounds uttered at the same time or in close time proximity to one of the gestures corresponds to the customer cue.

In an exemplary embodiment, the application is a live video streaming tool and the function causes output of a motion graphic associated with the recognized audio-video cue. However, the application is not limited to a video streaming tool and the function is not limited to output of a certain motion graphic. For example, the application could be a virtual assistant, and the function could be execution of a certain application. For example, if the custom cue is a thumbs up/down gesture and a word identifying the certain application, the virtual assistant could open/close the certain application whenever the user utters the word and makes the thumbs up/down gesture. In another example, the certain application is a music program that begins to play a song whenever the user utters a certain word (e.g., 'play') and makes a certain hand gesture (e.g., waves hand).

The video stream 122 may be received by the client interface 132 of the server 130 for forwarding to the cue detector 134 (e.g., a computer program). In an embodiment, the cue detector 134 generates negative prototype embeddings from the video stream 122, extracts visual features or visual and audio features from a current frame of the video stream 122, generates an input vector from the extracted features, applies the input vector to a few-shot model of the few-shot model database 138 to output a query embedding (e.g., a numerical vector), and compares the query embedding with respect to the positive prototype embeddings of each available custom cue and the negative prototype embeddings to determine whether the corresponding cue has been detected. The generation of the input vector and the comparison of the query embedding to the positive and negative prototype embeddings will be described in more detail below.

If the cue detector 134 determines a custom cue has been detected, the cue detector 134 outputs cue information 124 across the computer network 120 to the client device 110. The cue information 124 may include the corresponding cue identifier. The server 130 may forward the cue information 124 to the application, and the application may perform the function associated with the cue identifier located within the cue information 124. If the cue detector 134 does not detect a custom cue from the current embeddings, the cue detector 134 may repeat the above process on a next frame of the video stream 122 until it detects a customer cue or it has gone through the entire video stream 122.

According to an embodiment of the inventive concept in a client-only environment, the model builder 135 and the cue detector 134 are present on the client device 110, and the client device 110 creates the cue information 124 locally without reliance on the server 130. In an embodiment, the client device 110 has a local copy of a few-shot model or one accessible over the network 120, generates the positive embeddings locally from user feedback (i.e., the provided examples of the cue) and the local or accessible copy of the few-shot model, generates the query embedding and the negative embeddings locally based on a new video and the local copy of the few-shot model or one accessible over the network 120, and determines locally whether the cue has occurred using the query embedding, the negative embeddings, and positive embeddings.

The computer network 120 may be wired, wireless, or both. The computer network 120 may include multiple networks, or a network of networks, but is shown in a simple form so as not to obscure aspects of the present disclosure. By way of example, the computer network 120 includes one or more wide area networks (WANs), one or more local area networks (LANs), one or more public networks, such as the Internet, and/or one or more private networks. Where the computer network 120 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, the computer network 120 is not described in significant detail.

The client device 110 is a computing device capable of accessing the Internet, such as the World Wide Web. The client device 110 might take on a variety of forms, such as a personal computer (PC), a laptop computer, a mobile phone, a tablet computer, a wearable computer, a personal digital assistant (PDA), an MP3 player, a global positioning system (GPS) device, a video player, a digital video recorder (DVR), a cable box, a set-top box, a handheld communications device, a smart phone, a smart watch, a workstation, any combination of these delineated devices, or any other suitable device.

The client devices 110 includes one or more processors, and one or more computer-readable media. The computer-readable media may include computer-readable instructions executable by the one or more processors. The instructions may correspond to one or more applications, such as software to manage the graphical user interface 112, software to output the video stream 122, software to output the custom cue data 118, and software to receive the cue information 124.

The server 130 includes a plurality of computing devices configured in a networked environment or includes a single computing device. Each server 130 computing device includes one or more processors, and one or more computer-readable media. The computer-readable media may include computer-readable instructions executable by the one or more processors. The instructions may correspond to one or more applications, such as software to interface with the client device 110 for receiving the video stream 122, receiving the custom cue data 118, and outputting the cue information 124.

Figure 2:
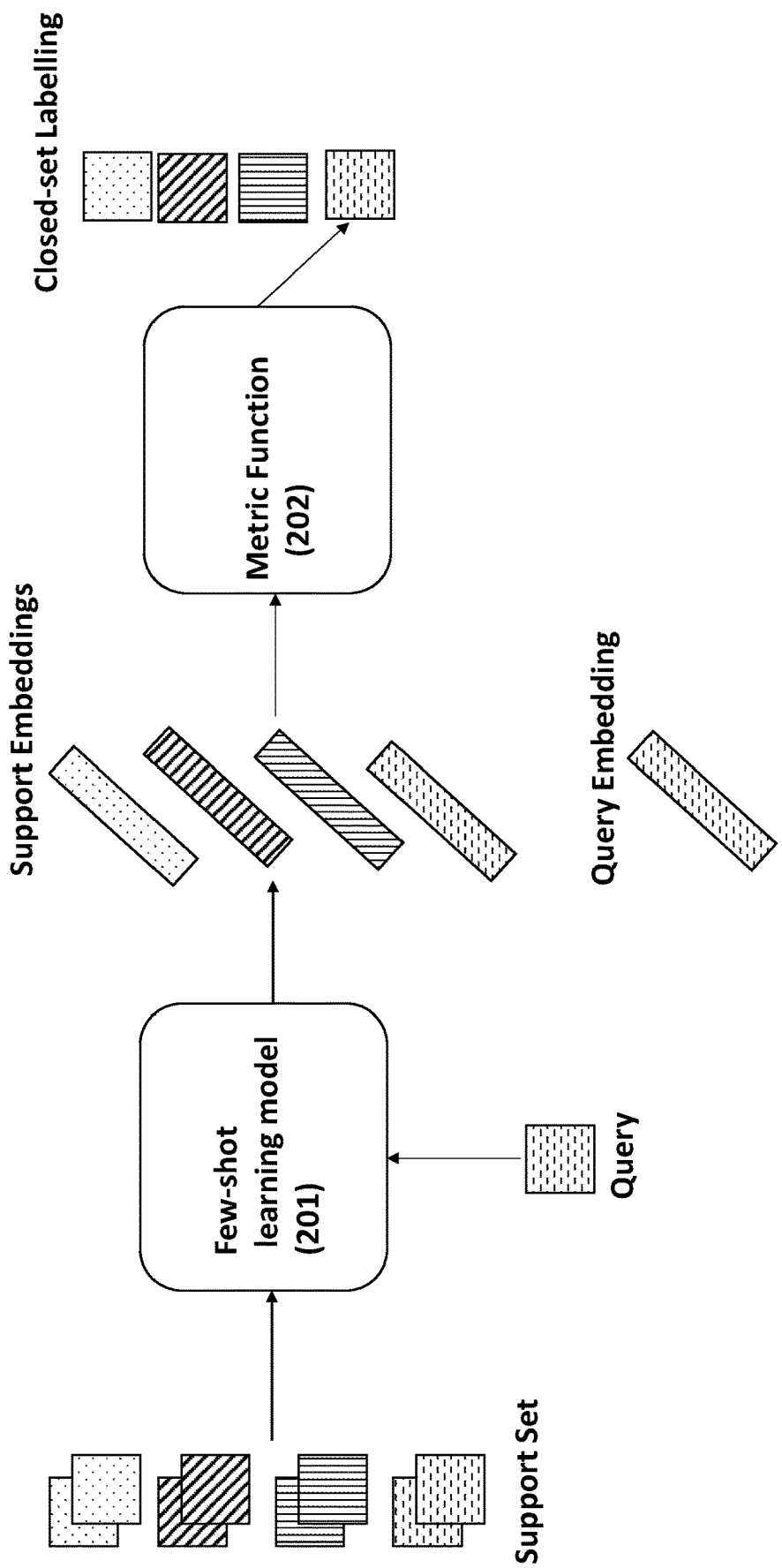
FIG. 2 illustrates training of a few-shot model.

FIG. 2 illustrates an example of a few-shot learning model 201 being trained. The few-shot learning model 201 is trained to embed (i.e., produce a numerical vector from the input) such that the embedding of a randomly chosen cue example (the query) is most similar to the average embedding of the support set of cues from that cue class (i.e., the positive support set).

For example, the query (e.g., see single box in FIG. 2 with fill of dashed horizontal lines) could be a video of a wave of a hand, and the positive support set of the target cue class could be a collection of 2 videos containing waves of a hand (e.g., see pair of overlapping boxes in FIG. 2 with fill of dashed horizontal lines). In addition to the positive support set, the few-shot learning model 201 receives a negative support set of other cue classes. For example, the few-shot learning model 201 could receive 2 videos for making a first (e.g., see pair of overlapping boxes in FIG. 2 with fill of dots), 2 videos for clapping (see pair of overlapping boxes in FIG. 2 with fill of diagonal lines), and 2 videos of moving a hand from left to right (e.g., see pair of overlapping boxes in FIG. 2 with fill of vertical lines).

At every iteration of the training, the target cue class and the other cue classes are chosen at random, which means they are different at each training iteration. Thus, the few-shot learning model 201 does not learn to recognize any specific set of cues. The few-shot learning model 201 learns to produce a good embedding for any cue, because at each iteration, it needs to discriminate between a new set of cues it hasn't necessarily seen. The training in FIG. 2 is a C-way K-shot classification task, where C (ways) is the fixed number of classes to discriminate between (e.g., C is 4 in FIG. 2), and K (shots) is the number of examples provided per-class at testing time (e.g., K is 2 in FIG. 2). The goal of this metric based-model is to embed the support and query sets into a discriminative embedding space, and correctly classify each query by measuring the similarity between the support and query embeddings using a Metric Function 202.

At each training iteration, a training episode is formed by randomly selecting C classes from the training set. For each selected class, K samples are first selected to build a support set S of size C×K, while a disjoint set of q samples are selected to form a query set Q of size C×q. Therefore, in each training episode, the model 201 is learning to solve the C-way K-shot classification task. By training with a large collection of episodes, each consisting of a different set of C classes, the model 201 learns how to learn from a limited labeled data and a class-agnostic discriminative ability.

Figure 3:
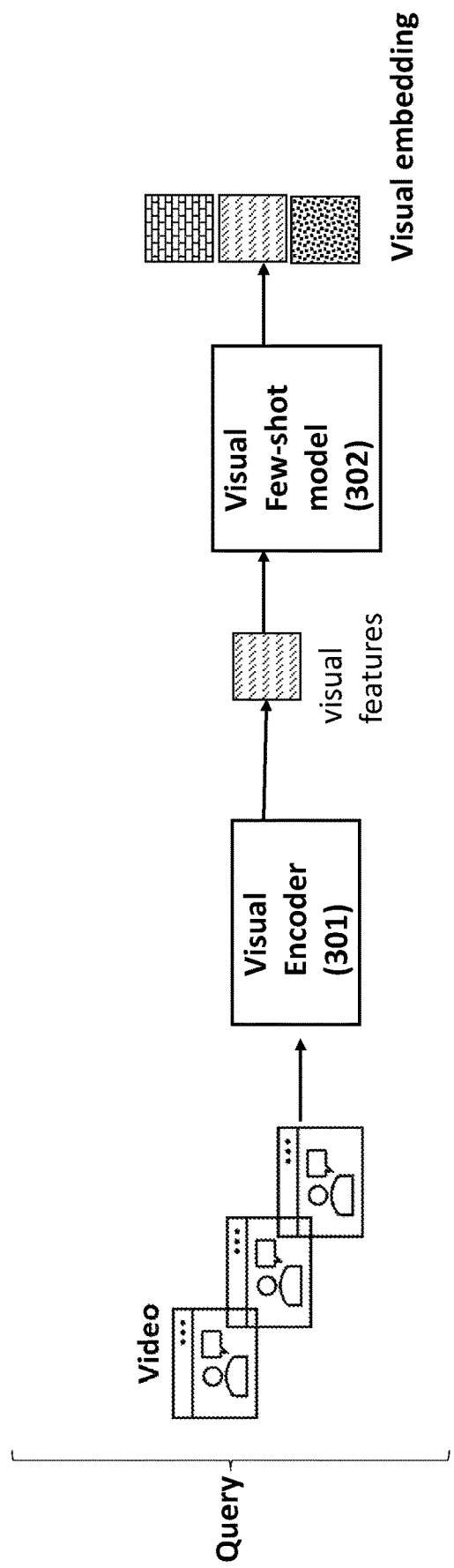
FIG. 3 illustrates a neural network for outputting a visual embedding.

FIG. 3 shows an example of the Neural Network configured recognize only gestures. In FIG. 3, the Neural Network includes a visual encoder 301 and a visual few-shot model 302. The visual few-shot model 302 is trained in a similar manner to the few-shot learning model 201. The visual encoder 301 may be referred to as a visual embedding network. In an embodiment, the video embedding network is a pre-trained SlowFast network. For example, the video embedding network may be pre-trained by a Kinetics 400 dataset, a full-body action-focused video dataset, etc. The input to the visual embedding network is a set of stacked video frames. Using both slow and fast pathways in SlowFast, frame-wise embedding vector are first extracted. Then, at the end, average-pooling is performed across all frame embeddings to produce a single dimensional D-dim vector $z^v$ per video.

The visual few-shot model 302 may be trained used visual training data stored in the training database 136. The visual training data may include videos of humans performing gestures that are each labelled to describe or identify the corresponding gesture. Each of the different gestures corresponds to a different class to form a plurality of gesture classes. The gesture classes may be divided into a first set for training, a second set for validation, and third set for testing.

Figure 4:
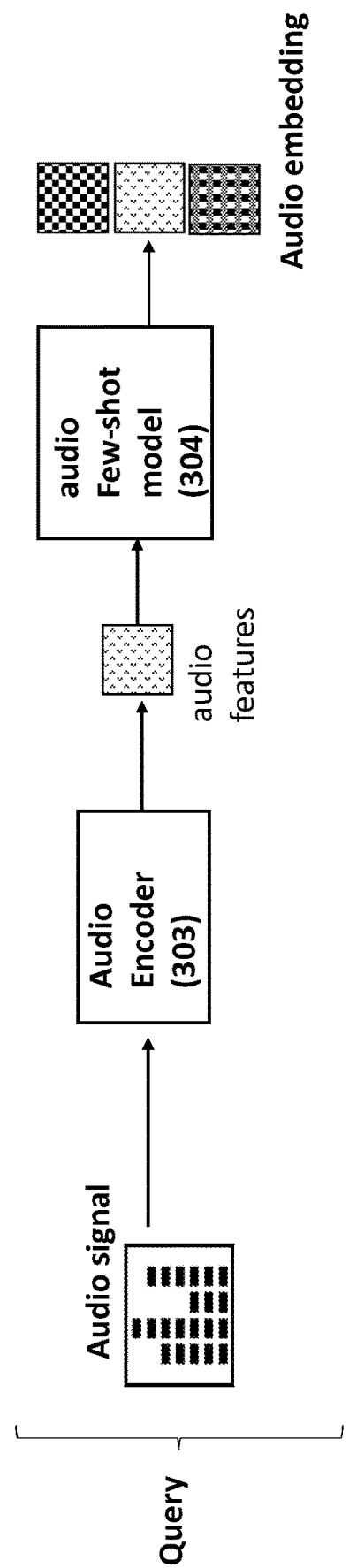
FIG. 4 illustrates a neural network for outputting an audio embedding.

FIG. 4 shows an example of a Neural Network configured recognize only words or sounds. In FIG. 4, the Neural Network includes an audio encoder 303 and an audio few-shot model 304. The audio few-shot model 304 is trained in a similar manner to the few-shot learning model 201. The audio encoder 303 may be referred to as an audio embedding network. The audio embedding network outputs an audio embedding $Z^a$. In an embodiment, the audio embedding network is a convolutional neural network (CNN) following SoundSeek with a feed-forward process. In an embodiment, the audio embedding network takes a time-frequency representation (e.g., a spectrogram) of an audio signal as input via short-time Fourier transform (STFT). In an embodiment, each convolution layer in the audio embedding network is followed by a batch normalization and a ReLU activation later.

The audio few-shot model 304 may be trained used audio training data stored in the training database 136. The audio training data may include audio recordings of humans (e.g., readers) reading articles as an example. In an embodiment, a distinct class is defined as a specific word spoken by a specific reader. The readers are partitioned into training, validation, and test sets. To construct a C-way K-shot training episode, a reader is randomly sampled from the training set, C word classes are sampled from the reader, and K instances per class are sampled to generate the support set. The query set may be comprised of a certain number (e.g., 16) of separate word instances per each of the C classes. The same method can be applied to other audio domains such as music, bioacoustics, and environmental sound to train a few-shot sound learning model.

While the above has described embedding networks using specific audio and visual backbones (e.g., a SlowFast network and CNN), the disclosure is not limited thereto as these networks may be implemented in various different ways.

In an embodiment where the user desires for the system to recognize a gesture combined with a word/sound, the Neural Networks of FIG. 3 and FIG. 4 may be run concurrently. For example, if the user creates a custom cue including a certain gesture and a certain word/sound, the custom cue is recognized when the visual few-shot model 302 recognizes the certain gesture and when the audio few-shot model 304 recognizes the certain word/sound. In this embodiment, the gesture and the word/sound need not occur at exactly the same time.

However, rather than operating two separate few-shot models, a single fused few-shot model may be generated to recognize a gesture combined with a word/sound. The audio information and the visual information are fused together, and the fused information is used to train the fused few-shot model. In an exemplary embodiment, in early fusion, each audio and visual embedding from the same video is fused through channel-wise concatenation, followed by training on such concatenated features. However, the audio and visual embeddings can be fused in other ways. In an exemplary embodiment, in late fusion, softmax scores are combined by averaging the L2-normalized softmax scores. In another embodiment, instead of averaging the scores, the minimum score can be used or the scores can be combined in a manner different from averaging. In a fused-shot model, the gesture and the word/sound occur at the same time or within a short period of time.

Figure 5:
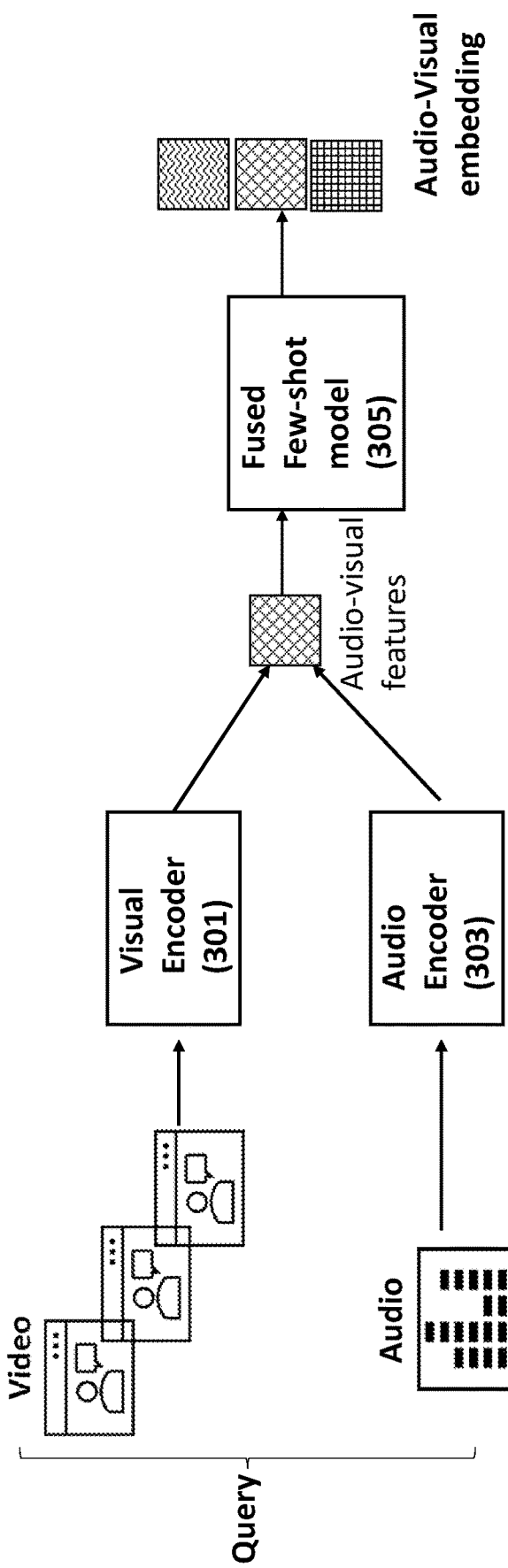
FIG. 5 illustrates a neural network for outputting an audio-visual embedding.

FIG. 5 shows an example of a Neural Network configured recognize gestures combined with words/sounds. The Neural Network includes the Visual encoder 301, the Audio encoder 303, and a fused few-shot model 305 (e.g., a fusion embedding network $f_0$). A class-wise prototype $h_c$, which is the mean vector of the embedded support set belonging to its class calculating using Equation 1.

$$h_c = \frac{1}{S_c} \sum_{z_i \in S_c} f_\theta(z_i), \quad (1)$$

where $z=(z^a, z^v)$, and the fusion embedding network $f_0$ may consist of several (e.g., 4) fully-connected layers followed by one or more ReLU activation layers. With the fusion embedding network $f_0$, audio and visual embeddings are optimally associated with learnable parameters. In the case of late fusion, embedding from each modality network is directly used. Given a query point, prototypical networks produce a distribution $p_\theta$ represented by Equation 2 over classes based on a softmax over distances to the prototypes in the discriminated embedding space.

$$p_\theta(y = c \mid x) = \frac{\exp(-d(f_\theta(z), h_c))}{\sum_{c'} \exp(-d(f_\theta(z), h_{c'}))}, \quad (2)$$

where $p_\theta$ (y=c|x) is a distribution and d(·) is a distance metric. In an embodiment, the Euclidean distance is used as d(·). All learnable parameters are trained by minimizing the negative log-probability with episodic training.

The fused few-shot learning model 305 is trained using a fused dataset stored in the training database 136. In an embodiment, the fused dataset is constructed using existing audio and visual datasets. For example, the visual data set may include videos of people making various different gestures or body movements each labelled with a distinct class label identifying the type of gesture/movement and the existing audio dataset may include videos of people uttering/speaking words or sounds each labelled with distinct class label identifying the word or sound. In an exemplary embodiment, the fused dataset is generated by randomly gluing a gesture from one of these datasets and a word/sound from another one of these datasets to make an audio-visual cue class. For example, if the visual dataset includes 10 gesture classes and the audio dataset includes 50 classes, up to 500 different audio-visual cue classes can be created. Therefore, a lot of cue classes can be generated for training with a large collection of episodes. Examples of the audio-visual classes may include a class representing a clapping hand combined with a clapping sound, a class representing a waving hand combined with a word in the name of a favorite program, a class representing a hand making a thumbs-up gesture combined with a whistling noise, a class representing a hand making a thumbs-down gesture combined with a phrase in a favorite song, etc.

Once the few-shot learning model(s) have been trained by the model builder 135, their parameters are fixed, and they can be stored in the model database 138. Next, during an inference stage, positive prototype embeddings (e.g., numerical vectors that may be referred to as positive vectors) are generated by the model builder 135 in response to receiving the custom cue data 118 from the client device 110 for generating the custom cue (e.g., a visual trigger for only a gesture, or an audio-visual trigger for a gesture combined with a word/sound). The prototype positive embeddings for each class can then be used later to determine whether one of the given classes has occurred within a new video, which will be described in more detail below.

Figure 6:
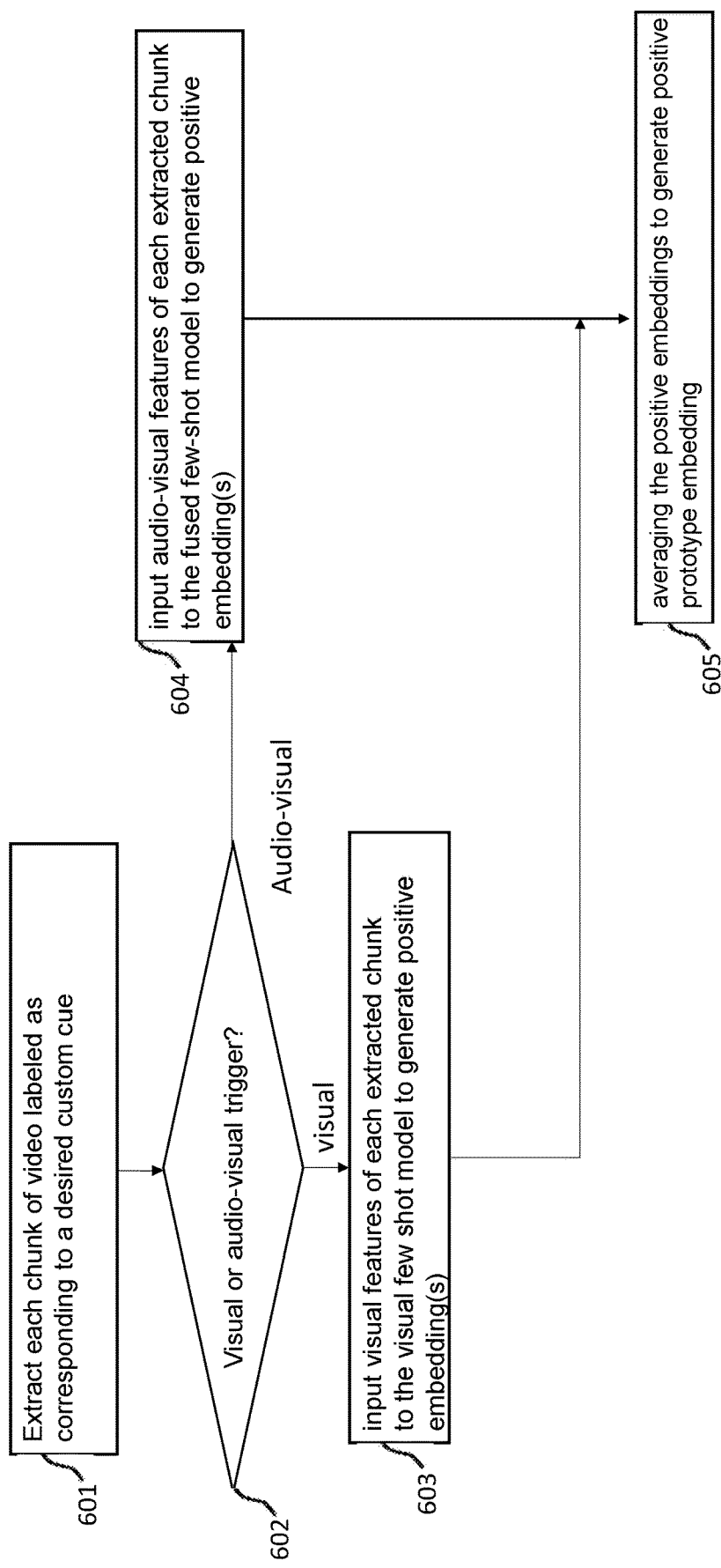
FIG. 6 illustrates a method for generating positive prototype embeddings for use in detecting the visual or the audio-visual cue, according an embodiment of the disclosure.

FIG. 6 illustrates a method for generating the positive prototype embeddings according to an embodiment of the disclosure.

The method of FIG. 6 includes extracting each chunk of a video of the custom cue data (e.g., 118) labeled as corresponding to a desired custom cue (step 601). For example, if the video runs for 30 seconds, and the metadata of the video indicates the cue starts at time 5 and ends at time 7, and begins again at time 12 and ends again at time 14, the extracting would extract a first chunk of video spanning times 5 to 7 and a second chunk of video spanning times 12 to 14. While the extracted chunks are described above as each being two seconds long (e.g., a part of a video), the durations of the extracted chunks may be different from one another and have various different lengths.

The method of FIG. 6 further includes determining whether the custom cue data (e.g., 118) indicates the cue is a visual cue or an audio-visual cue (step 602).

If the desired cue is a visual cue, the method of FIG. 6 includes inputting visual features of each extracted chunk to the visual few shot model (e.g., 302) to generate a positive embedding (step 603). The visual features may be extracted using the visual encoder 301. For example, if there are 8 total chunks, and three are labeled as corresponding to the visual cue, then three positive embeddings would be generated.

If the desired cue is an audio-visual cue, the method of FIG. 6 further includes inputting audio-video features of each extracted chunk to the fused few-shot model 305 to generate a positive embedding (step 604). The audio-video features may be generated from by concatenating outputs of the visual encoder 301 and the audio encoder 303. For example, if there are 10 total chunks, and two are labeled as corresponding to the audio-visual cue, then two positive embeddings would be generated.

The method of FIG. 6 further includes averaging the positive embeddings together to generate a single positive prototype embedding for the desired cue (step S605).

The method of FIG. 6 may be operated on each custom cue desired so that there is a positive prototype embedding for each custom cue. Each positive prototype embedding may be stored in a different entry of a table in memory of the server 130, where the entry includes the corresponding embedding and a corresponding cue identifier. The positive prototype embedding per custom cue (or class) can be used later to recognize an instance of the custom cue in a new video.

Figure 7:
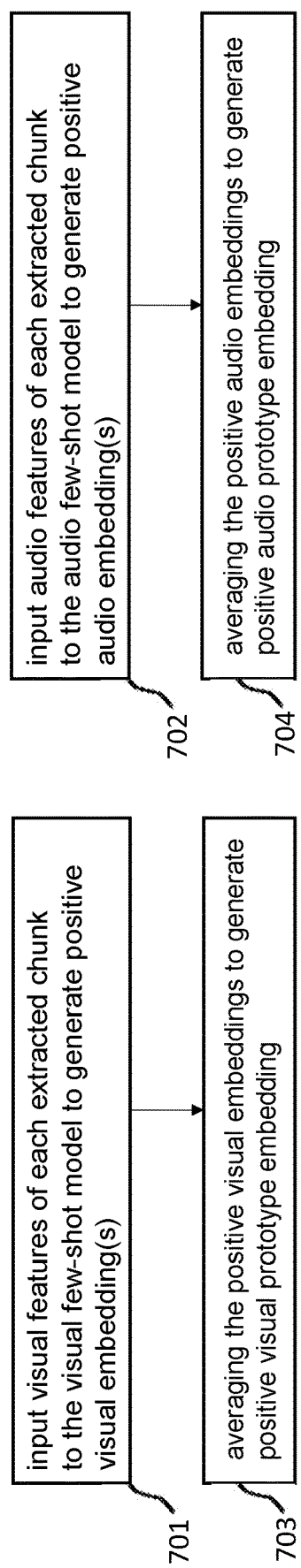
FIG. 7 illustrates a method for generating positive prototype embeddings for use in detecting the audio-visual cue, according an embodiment of the disclosure.

In an alternate embodiment, where there are two concurrent models (e.g., a visual few-shot model 302 and an audio few-shot model 304, steps 604 and 605 of FIG. 6 are replaced by the method of FIG. 7.

The method of FIG. 7 includes inputting visual features of each extracted chunk to the visual few-shot model 302 to generate positive visual embedding(s)(step 701). The visual few-shot model 302 may be a neural network trained by detecting one of several visual classes during training. At each iteration, the set of visual classes is different. Rather than the final model being trained to detect a specific set of visual classes, the final model is trained to output an embedding. Detecting of specific visual classes is used during the training so that the model learns how to generate good embeddings. When a new visual feature is input to the neural network, the neural network outputs a numerical vector. The numerical vector may also be referred to as an embedding. Since the embedding represents one of the several visual classes it may be referred to as a positive embedding, and since the positive embedding is derived from visual features, it may be referred to as a positive visual embedding. If an example video includes two examples of a visual cue (e.g., a waving hand), a visual feature of the chunk of the example video including the first example is applied to the neural network to generate a first positive visual embedding, and a visual feature of the chunk of the example video including the second example is applied to the same neural network to generate a second positive visual embedding.

The method of FIG. 7 further includes inputting audio features of each extracted chunk to the audio few-shot model 304 to generate positive audio embedding(s) (step 702).

The steps of 701 and 702 may be run concurrently, step 701 may be run before S702, or step 702 may be run before step S701.

The method of FIG. 7 further includes averaging the positive visual embeddings together to generate a single positive visual prototype embedding for the desired cue (step S703). Since each positive visual embedding is a numerical vector, the averaging may be performed by adding the positive visual embeddings to generate a sum and dividing the sum by the number of positive visual embeddings. Other methods may be used to perform the averaging such as use of a median or mode calculation, or a weighted averaging could be performed that weights some of the positive visual embeddings more than others.

The method of FIG. 7 further includes averaging the positive audio embeddings together to generate a single positive audio prototype embedding for the desired cue (step S704).

The steps of 703 and 704 may be run concurrently, step 703 may be run before S704, or step 704 may be run before step S703.

As discussed above, when the user interface 112 performs the application, the client device 110 may output a video stream 122 to the server 130 that includes images of one or more gestures and audio of one or more words/sounds. In an embodiment, in response to receiving the video stream 122, the cue detector 134 selects a few-shot model from the database 138, processes the video stream 122 to generate negative prototype embeddings (e.g., numerical vectors that may be referred to as negative vectors or embeddings) and a query, applies the query to the selected few-shot model, and uses an output of the selected few-shot model, the negative prototype embeddings, and the positive prototype embeddings associated with its supported cue classes (e.g., audio-visual classes, visual classes, etc.) to determine whether it can recognize one of the supported cue classes in the query.

Figure 8:
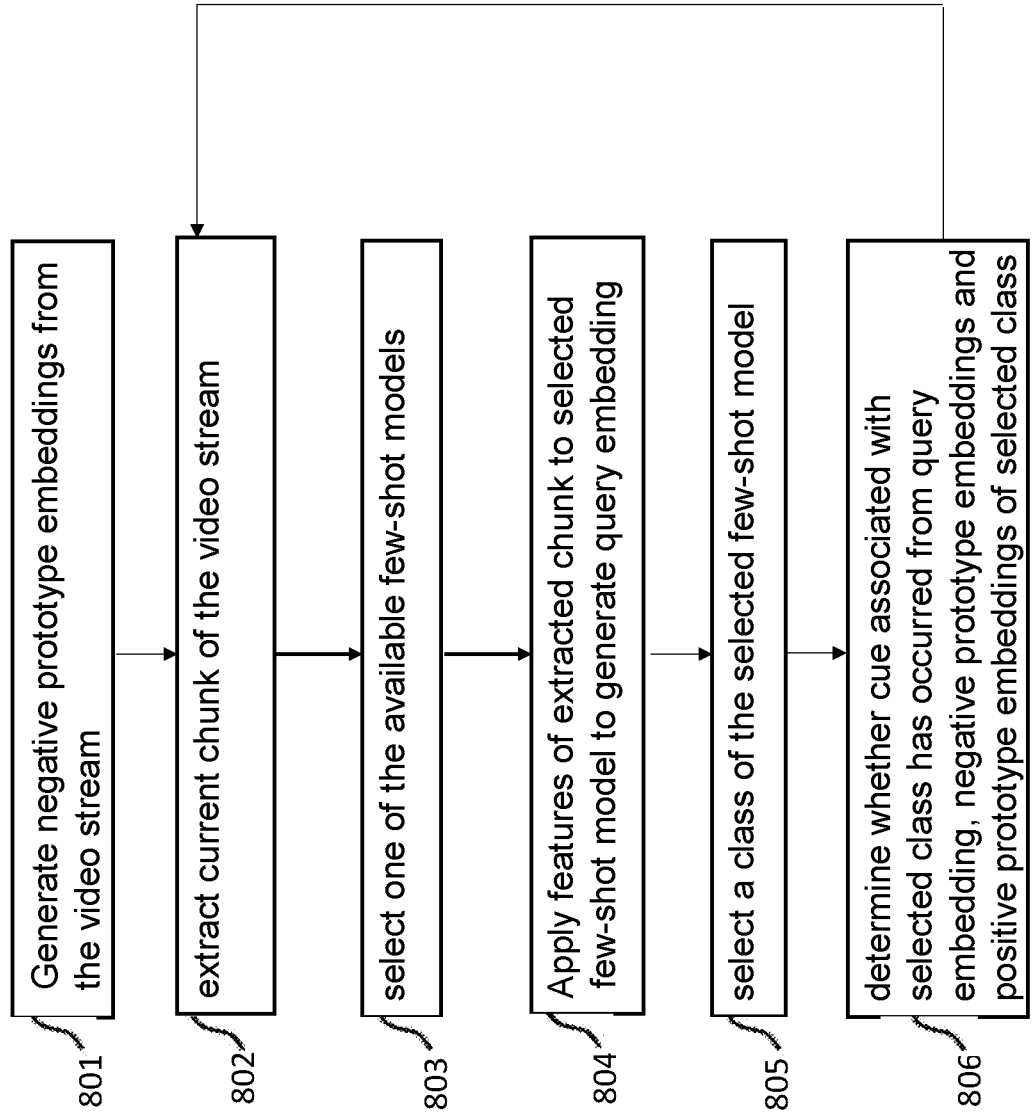
FIG. 8 illustrates a method of determining whether a cue has occurred within a new video, according an embodiment of the disclosure.

FIG. 8 illustrated a method processing the video stream 122 to detect a cue, according to an embodiment of the disclosure.

The method of FIG. 8 further includes generating negative prototype embeddings (or negative embeddings) from the video stream (step 801). For example, the video stream 122 could be divided into chunks, and each chunk could be applied to a Neural Network such as that shown in FIGS. 3-5 to generate a negative prototype embedding (e.g., a numerical vector) for each chunk. The Neural Network is trained to detect one of a plurality of available classes. A negative embedding derived from applying features of a given one of the chunks to the Neural Network may indicate that the given chunk is not an example of one of the available classes. For example, in a long video stream 122 of a user performing a certain cue for only a short portion of the video stream, most of the chunks of the video stream 122 will be examples of the user not performing the certain cue. The length of each chunk may be the same in one embodiment, or some of the chunks may have different lengths in another embodiment. In an embodiment, the negative prototype embeddings are averaged together to generate a single negative prototype embedding.

The method of FIG. 8 includes extracting a current chunk of the video stream (step 802). The current chunk is a part of a video of the video stream 122. The part may include one or more frames of the video.

The method of FIG. 8 further includes selecting one of the available few-shot models (step 803). For example, the cue detector 134 may select one of the few-shot models from the database 138.

The method of FIG. 8 further includes applying features of the extracted chunk to the selected few-shot model to generate a query embedding (step 804). If the selected few-shot model is the visual few-shot model 302, step 804 applies visual features of the extracted chunk to the visual few-shot model 302 to generate the query embedding. If the selected few-shot model is the audio few-shot model 304, step 804 applies audio features of the extracted chunk to the audio few-shot model 304 to generate the query embedding. If the selected few-shot model is the fused few-shot model 305, step 804 applies audio-visual features of the extracted chunk to the fused few-shot model 305 to generate the query embedding.

The method of FIG. 8 further includes selecting a class of the selected few-shot model (step 805). For example, if the few-shot model is a visual few-shot model and the model includes a class representing a waving hand, a class representing a hand making a thumbs-up gesture, and a class representing a thumbs-down gesture, the selecting could cause selection of the class representing the waving hand.

The method of FIG. 8 further includes determining whether the cue associated with the selected class has occurred from the query embedding, the negative prototype embeddings, and the positive prototype embeddings of the selected class (step 806). For example, the negative prototype embeddings may be averaged together to generate a single negative prototype embedding, the positive prototype embeddings may be averaged together to generate a single positive prototype embedding, and the determination may be performed using the query embedding, the single negative prototype embedding, and the single positive prototype embedding. If the cue to be detected is an audio-visual cue and fusion is not used, then there will be a query visual embedding and a query audio embedding due to step 803 being used to output visual features of the extracted chunk to the visual few-shot model 302 and step 804 being used to output audio features of the extracted chunk to the audio few-shot model 304.

In an embodiment, step 806 is performed by calculating a first distance (e.g., a Euclidean distance) between the query embedding and the single positive prototype embedding, calculating a second distance (e.g., a Euclidean distance) between the query embedding and the single negative prototype embedding, normalizing the two distances (e.g., using a softmax function) so they represent respective positive and negative probabilities that sum to 1 (e.g., probability_pos=1−probability_neg), and determining that the class associated with the single positive prototype embedding has been detected when the positive probability exceeds a certain threshold (e.g., 0.5, 0.6, etc.).

If the class to be detected is an audio-visual class, and the visual few-shot model 302 and the audio few-shot model 304 are used concurrently, then steps 801-806 are performed once using the visual few-shot model 302 to generate a first probability and steps 801-806 are performed a second time using the audio few-shot model 304 to generate a second probability. If both the first and second probabilities are above the threshold, then the audio-visual class has been detected. In an embodiment, each of the first and second probabilities are compared with different thresholds since the threshold for detecting a visual class could be different from the threshold for detecting an audio class.

Steps 802-806 of the method of FIG. 8 may be repeated for each next chunk of the video stream until the entire video stream has been gone through. Each time a cue class is detected in a given video chunk, the application may execute a function associated with the detected cue class.

The selected few-shot model may have several associated cue classes since the user may have used the user interface 112 to create multiple different custom cues. Thus, steps 805 and 806 may be repeated for each class of the selected few-shot model. However, when the threshold is set too low, the positive probability of more than one of these classes may be above the threshold. In an embodiment, the class having the highest positive probability among those above the threshold is the detected class.

In another embodiment where the selected few-shot model has several associated cue classes, instead of converting a positive and a negative distance into two probabilities that sum to 1, the distance of the query embedding to each of the positive prototype embeddings plus the distance to the negative prototype embedding is converted into a set of probabilities that sums to 1. For example, if there are positive prototype embeddings for 3 cues and the negative prototype embedding for the negative, each of the 3 positive embeddings are compared against the query embedding to get 4 distances, and the 4 distances are converted into 4 probabilities (e.g., 3 positive probabilities and 1 negative probability) that jointly sum to 1. The highest probability among the 4 is selected. If the highest selected probability is the negative probability, no cue is detected. If the highest selected probability is one of the 3 positive probabilities, then the detected cue corresponds to the cue associated with the highest selected probability.

Figure 9:
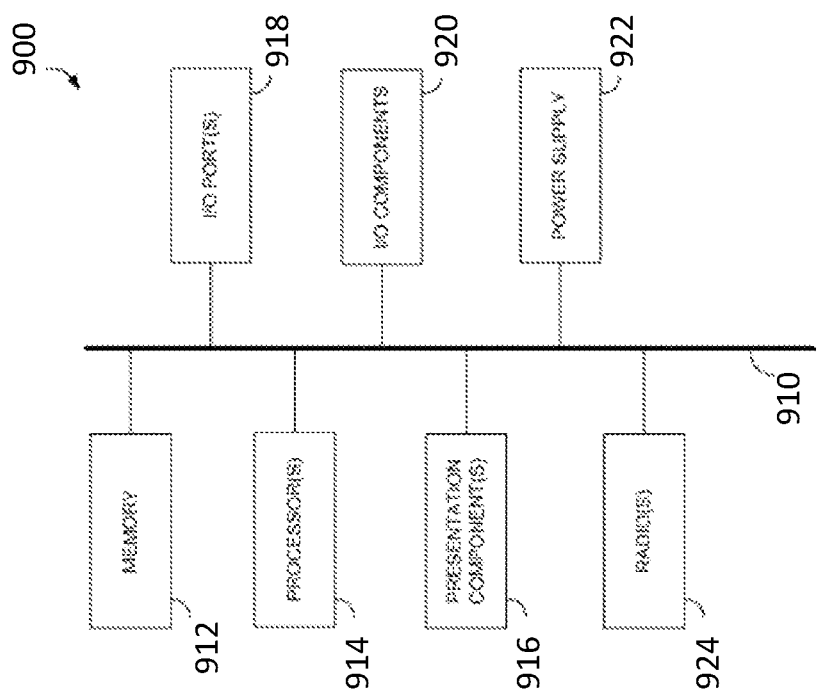
FIG. 9 illustrates an exemplary computing device used to perform one or more methods of the disclosure.

Having described implementations of the present disclosure, an exemplary operating environment in which embodiments of the present invention may be implemented is described below to provide a general context for various aspects of the present disclosure. Referring initially to FIG. 9 in particular, an exemplary operating environment for implementing embodiments of the present invention is shown and designated generally as computing device 900. Computing device 900 is but one example of a suitable computing environment and is not intended to suggest any limitation as to the scope of use or functionality of the invention. Neither should the computing device 900 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 9, computing device 900 includes bus 910 that directly or indirectly couples the following devices: memory 912, one or more processors 914, one or more presentation components 916, input/output (I/O) ports 918, input/output components 920, and illustrative power supply 922. Bus 910 represents what may be one or more busses (such as an address bus, data bus, or combination thereof). For example, one may consider a presentation component such as a display device to be an I/O component. The diagram of FIG. 9 is merely illustrative of an exemplary computing device that can be used in connection with one or more embodiments of the present invention. Distinction is not made between such categories as "workstation,"

"server," "laptop," "hand-held device," etc., as all are contemplated within the scope of FIG. 9 and reference to "computing device."

Memory 912 includes computer-storage media in the form of volatile and/or nonvolatile memory. The memory may be removable, non-removable, or a combination thereof. Exemplary hardware devices include solid-state memory, hard drives, optical-disc drives, etc. For example, the training data and the few-shot models may be stored in the memory 912 when the server 130 is implemented by computing device 900. The computing device 900 includes one or more processors that read data from various entities such as memory 912 or I/O components 920. Presentation component(s) 916 present data indications to a user or other device. Exemplary presentation components include a display device, speaker, printing component, vibrating component, etc.

I/O ports 918 allow computing device 900 to be logically coupled to other devices including I/O components 920, some of which may be built in. Illustrative components include a microphone, joystick, game pad, satellite dish, scanner, printer, wireless device, etc. The I/O components 920 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye tracking, and touch recognition associated with displays on the computing device 900. The computing device 900 may be equipped with depth cameras, such as, stereoscopic camera systems, infrared camera systems, RGB camera systems, and combinations of these for gesture detection and recognition.

As discussed above, a cue may be detected from an input video using an example video including one or more examples of the cue in corresponding chunks and by applying a feature of the chunks and a feature of the input video to the neural network. The cue may include a visual cue, and the neural network may include a visual embedding network configured to operate on video frames of audiovisual signals to generate visual embeddings. The cue may further include an audible cue, and the neural network may include an audio embedding network configured to operate on a spectrogram of an audio signal of the audiovisual signals to generate audio embeddings. A part of the example video where the cue occurs may be determined by presenting a user interface to enable a user mark begin and end points within the example video where the corresponding cue occurs. The begin and end points may be appended to the example video as metadata. The neural network may be trained by extracting gestures from a first dataset of labeled gestures, extracting sounds from a second dataset of labeled sounds, combining a random one of the extracted gestures and a random one of the extracted sounds to generate an audio-visual class, repeating the combining until a plurality of audio-visual classes have been generated, and training the neural network to output a numerical vector for each of the plurality of audio-visual classes. The training may further include randomly selecting a set of the audio-visual classes, choosing a subset of samples within each class of the set as a support set and the remaining samples as queries, applying the subset to the neural network to output training embeddings, applying the queries to the neural network to output query embeddings, and adjusting parameters of the neural network based on the training and query embeddings. The application of the feature of a given one of the chunks to the neural network may include extracting a current frame of the input video and applying audio-visual features of the current frame to the neural network. The application of the feature of the input video to the neural network may include applying audio features of the feature to a few-shot learning model trained to operate on audio features to output an audio embedding and applying visual features of the feature to a few-shot learning model trained to operate on visual features to output a video embedding. The application of the feature of the input video to the neural network may include applying audio-visual features of the feature to a few-shot learning model trained to operate on a combination of audio and video features to output an audio-visual embedding. The cue may be determined in the input video by averaging the negative embeddings to generate an average, determining a first distance from the query embedding to the positive embedding, determining a second distance from the query embedding to the average, determining a probability from the distances, and determining that the cue occurs in the input video when the probability exceeds a threshold.

As discussed above, a system is provided that includes a user interface and enables a user to create a cue that causes an action to be performed. The function may cause presentation of motion graphics on a display device. The user interface may be configured to enable a user to mark a start time and an end time of an example video where the cue occurs, and a client device may output information indicating the start and end times across a network to a server. The server may apply audio-visual features of the example video between the start and end times to a few-shot learning model to generate a positive vector, and may apply audio-visual features of an entire input video to the few-shot learning model to generate a negative vector.

As discussed above, a method for detecting a gesture and a sound occurring in an input video is provided. The method may include dividing the entire input video into a plurality of chunks, applying an audio feature of each chunk to a first neural network to generate a plurality of negative audio embeddings, applying an audio feature of each chunk to a second neural network to generate a plurality of negative visual embeddings, and determining whether the gesture and the sound occur together in the input video from a query audio embedding, a query visual embedding, a positive audio embedding, a positive video embedding, the negative audio embeddings, and the negative visual embeddings. The sound may correspond to a spoken word. The first neural network may include an audio encoder configured to output audio features and a first few-shot model trained to output an audio embedding from the audio features, and the second neural network may include a video encoder configured to output video features and a second few-shot model trained to output a visual embedding from the video features.

The present invention has been described in relation to particular embodiments, which are intended in all respects to be illustrative rather than restrictive. Alternative embodiments will become apparent to those of ordinary skill in the art to which the present invention pertains without departing from its scope.

What is claimed is:

1. A method for detecting a cue in an input video, the method comprising:
presenting a user interface to record an example video of a user performing an act including the cue;
determining a part of the example video where the cue occurs;

applying a feature of the part to a neural network to generate a positive embedding;
dividing the input video into a plurality of chunks and applying a feature of each chunk to a neural network to output a plurality of negative embeddings;
applying a feature of a given one of the chunks to the neural network to output a query embedding; and
determining whether the cue occurs in the input video from the query embedding, the positive embedding, and the negative embeddings.

2. The method of claim 1, wherein the cue includes a visual cue, and the neural network includes a visual embedding network configured to operate on video frames of audiovisual signals to generate visual embeddings.

3. The method of claim 2, wherein the cue further includes an audible cue, and the neural network includes an audio embedding network configured to operate on a spectrogram of an audio signal of the audiovisual signals to generate audio embeddings.

4. The method of claim 1, the determining of the part of the example video where the cue occurs comprises presenting a user interface to enable the user to mark begin and end points within the example video where the corresponding cue occurs.

5. The method of claim 4, further comprising appending metadata to the example video including the begin and end points.

6. The method of claim 1, further comprises:
extracting gestures from a first dataset of labeled gestures;
extracting sounds from a second dataset of labeled sounds;
combining a random one of the extracted gestures and a random one of the extracted sounds to generate an audio-visual class;
repeating the combining until a plurality of audio-visual classes have been generated; and
training the neural network to output a numerical vector for each of the plurality of audio-visual classes.

7. The method of claim 6, further comprises:
randomly selecting a set of the audio-visual classes;
choosing a subset of samples within each class of the set as a support set and the remaining samples as queries;
applying the subset to the neural network to output training embeddings;
applying the queries to the neural network to output query embeddings; and
adjusting parameters of the neural network based on the training and query embeddings.

8. The method of claim 1, wherein the applying of the feature of the given one chunk to the neural network to output the query embedding comprises:
extracting a current frame of the input video; and
applying audio-visual features of the current frame to the neural network.

9. The method of claim 1, wherein the applying of the feature of the part to the neural network to generate the positive embedding comprises:
applying audio features of the feature to a few-shot learning model trained to operate on audio features to output an audio embedding; and
applying visual features of the feature to a few-shot learning model trained to operate on visual features to output a visual embedding.

10. The method of claim 1, wherein the applying of the feature of the part to the neural network to generate the positive embedding comprises applying audio-visual features of the feature to a few-shot learning model trained to operate on a combination of audio and visual features to output an audio-visual embedding.

11. The method of claim 1, wherein the determining whether the cue occurs in the input video comprises:
averaging the negative embeddings to generate an average;
determining a first distance from the query embedding to the positive embedding;
determining a second distance from the query embedding to the average;
determining a probability from the distances; and
determining that the cue occurs in the input video when the probability exceeds a threshold.

12. A system configured to enable a user to create a cue that causes an action to be performed, the system comprising:
a client device comprising a user interface configured to enable a user to identify a function to be performed when the cue is recognized and record an example video of the user performing the cue, and a computer program configured to record an input video of the user, wherein the client device outputs the example and input videos across a computer network; and
a server configured to receive the example and input videos from the computer network, apply a feature of the example video to a few-shot learning model to output a positive vector, apply features of the entire input video to the few-shot learning model to output a negative vector, apply a feature of a part of the input video to the few-shot learning model to output a query vector, determine whether the cue has been detected in the input video based on the query vector, the positive vector, and the negative vector, and output information across the network to the client device when the cue has been detected,
wherein the computer program is configured to perform the function upon receiving the information.

13. The system of claim 12, wherein the function causes presentation of motion graphics on a display device.

14. The system of claim 12, wherein the user interface is configured to enable the user to mark a start time and an end time of the example video where the cue occurs and the client device outputs information indicating the start and end times across the network to the server.

15. The system of claim 14, wherein the server applies audio-visual features of the example video between the start and end times to the few-shot learning model to generate the positive vector, and applies audio-visual features of the entire input video to the few-shot learning model to generate the negative vector.

16. A method for detecting a gesture and a sound occurring in an input video, the method comprising:
presenting a user interface to record an example video of a user performing the gesture and making the sound;
determining a first part of the example video where the sound occurs;
determining a second part of the example video where the gesture occurs;
applying an audio feature of the first part to a first neural network to generate a positive audio embedding;
applying a visual feature of the second part to a second neural network to generate a positive visual embedding;
applying an audio feature of a part of the input video to the first neural network to output a query audio embedding;

applying a visual feature of the part to the second neural network to output a query visual embedding; and determining whether the gesture and the sound occur in the input video from the query audio embedding, the query visual embedding, the positive audio embedding, the positive visual embedding, and negative embeddings determined from the entire input video.

17. The method of claim 16, wherein the determining of whether the gesture and the sound occur comprises:

dividing the entire input video into a plurality of chunks;

applying an audio feature of each chunk to the first neural network to generate a plurality of negative audio embeddings among the negative embeddings;

applying an audio feature of each chunk to the second neural network to generate a plurality of negative visual embeddings among the negative embeddings; and determining whether the gesture and the sound occur together in the input video from the query audio embedding, the query visual embedding, the positive audio embedding, the positive visual embedding, the negative audio embeddings, and the negative visual embeddings.

18. The method of claim 16, wherein the determining of whether the gesture and the sound occur comprises:

determining whether the gesture occurs in the input video from the query visual embedding, the positive visual embedding, and the input video; and determining whether the sound occurs in the input video from the query audio embedding, the positive audio embedding, and the input video.

19. The method of claim 16, wherein the sound corresponds to a spoken word.

20. The method of claim 16, wherein the first neural network comprises an audio encoder configured to output audio features and a first few-shot model trained to output an audio embedding from the audio features, and the second neural network comprises a video encoder configured to output visual features and a second few-shot model trained to output a visual embedding from the visual features.

* * * * *